United States Patent [19]

Maeda

[11] Patent Number: 5,661,795
[45] Date of Patent: Aug. 26, 1997

[54] ADAPTIVE SIGNAL PROCESSING DEVICE, ECHO SUPPRESSING DEVICE AND HAND-PORTABLE TELEPHONE DEVICE

[75] Inventor: Yuji Maeda, Tokyo, Japan

[73] Assignee: Sony Corporation, Tokyo, Japan

[21] Appl. No.: 515,448

[22] Filed: Aug. 15, 1995

[30] Foreign Application Priority Data

Aug. 16, 1994 [JP] Japan ................................ 6-192441

[51] Int. Cl.$^6$ .............................. H04M 9/00; H04B 3/23
[52] U.S. Cl. ..................... 379/412; 379/408; 379/410; 379/411; 370/290
[58] Field of Search ......................... 379/412, 410, 379/411, 406, 409, 407, 408; 370/32.1; 364/724.19

[56] References Cited

U.S. PATENT DOCUMENTS

| | | | |
|---|---|---|---|
| 5,278,900 | 1/1994 | Van Gerwen et al. | 379/410 |
| 5,289,539 | 2/1994 | Maruyama | 379/410 |
| 5,428,605 | 6/1995 | Andre | 379/410 |
| 5,463,618 | 10/1995 | Furukawa et al. | 379/410 |

*Primary Examiner*—Krista M. Zele
*Assistant Examiner*—Jacques M. Saint-Surin
*Attorney, Agent, or Firm*—Jay H. Maioli

[57] ABSTRACT

An adaptive signal processing device employed in a hand-portable telephone configured to adaptively estimate signal transfer characteristics in a transmission system and process signals based upon such estimation includes a power calculating unit, a filter coefficient updating unit, an arithmetic-logical unit and an echo removing unit. The power calculating unit calculates the power of a first input signal x(n) entering the device via a transmission system. The filter coefficient updating unit calculates a filter coefficient h(n+1)(i) updated at time n+1 based upon the first input signal x(n), a signal e(n) corresponding to a second input signal d(n) to be transmitted over the transmission system less a pseudo-echo component, a signal $2^{Pe}$ outputted by the power calculating unit, a control constant a and a filter coefficient h(n)(i) at time n, in accordance with an equation $$h_{(n+1)}(i)=h_{(n)}(i)+\alpha(e(n)\times(n-i))2^{Pe}$$

A convolution unit performs convolution on the first input signal x(n) using filter coefficients from the filter coefficient updating unit, while an echo removing unit removes echo components contained in the second input signal d(n) by an output signal of the convolution unit.

16 Claims, 5 Drawing Sheets

ADAPTIVE SIGNAL PROCESSING DEVICE, ECHO SUPPRESSING DEVICE AND HAND-PORTABLE TELEPHONE DEVICE

BACKGROUND OF THE INVENTION

1. Field of the Invention

This invention relates to an adaptive signal processing device, an echo suppressing device and a hand-portable telephone device. More particularly, it relates to an adaptive signal processing device, an echo suppressing device and a hand-portable telephone device configured to eliminate echo components.

2. Background of the Invention

In a satellite communication, submarine communication or a communication system employing a hand-portable telephone, an echo, that is an acoustic loop between a speaker and a microphone, may occur. Such echo not only deteriorates the quality of talk significantly, but invokes a feeling of alienation to the user.

Among known echo cancellation devices, there is a device in which transfer characteristics of an echo route looking from an installation station mounted in the hand-portable telephone are adaptively estimated to generate pseudo echo which then is subtracted from an echo-containing signal.

There is employed an adaptive filter having a so-called learning identification method and configured to sequentially estimate system parameters for adaptively estimating transfer characteristics. The portion of the cancellation device that corrects filter coefficients of the adaptive filter is called an adaptive algorithm.

A variety of adaptive algorithms for echo cancellation have hitherto been devised. Among the requirements for the adaptive algorithms are increased speed of convergence and execution and reduction in hardware size. In general, the better the convergence characteristics of the adaptive algorithm, the higher the processing quantity.

Among these adaptive algorithms, there is a least mean square (LMS) algorithm for correcting the filter coefficients to a minimum value based upon the acutest descent method. This adaptive algorithm has merit in that the least amount of processing operations suffices.

Another adaptive algorithm is the learning identification method which represents improvement of the LMS algorithm. This learning identification method is widely applied to products and put to practical use because of its superior converging characteristics.

It is known with the adaptive algorithm by the learning identification method that an operation of division in the adaptive algorithm needs to be executed from one speech sample to another. With the learning identification method, which represents improvement of the above-mentioned LMS algorithm, the quantity of residual echo may be diminished by its superior converging characteristics. However, as for the total quantity of processing operations, it is inferior to the LMS algorithm because of the necessity of executing division from one speech sample to another. Consequently, the load placed on the digital signal processor (DSP) mounted on a device implementing the learning identification method becomes significant.

In a hand-portable telephone employed in actual environments, echo estimation is delayed due to mixing of noise or the speech of the speaking party, thus significantly affecting converging characteristics of the echo cancellation device. The possible result is distortion of the speech of the speaking party on the side of the hand-portable telephone.

SUMMARY OF THE INVENTION

It is therefore an object of the present invention to provide an adaptive signal processing device which resolves the above-mentioned problem.

It is another object of the present invention to provide an echo suppressing device which resolves the above-mentioned problem.

It is a further object of the present invention to provide a hand-portable telephone device which resolves the above-mentioned problem.

In one aspect, the present invention provides an adaptive signal processing device for adaptively estimating signal transfer characteristics in a transmission system for processing signals in accordance with the estimation. The device includes power calculating means for calculating the power of a first input signal $x(n)$ entering the device via a transmission system, and filter coefficient updating means for calculating a filter coefficient $h(n+1)(i)$ updated at time $n+1$ based upon the first input signal $x(n)$, a signal $e(n)$ corresponding to a second input signal $d(n)$ to be transmitted over the transmission system less a pseudo-echo component, a signal $2^{Pe}$ output by said power calculating means, a control constant $a$ and a filter coefficient $h(n)(i)$ at time $n$, in accordance with the equation $$h_{(n+1)}(i) = h_{(n)}(i) + \alpha(e(n) \times (n-i)) 2^{Pe}$$

The device also includes convolution means for performing convolution on the first input signal $x(n)$ and filter coefficients from the filter coefficient updating means, and echo removing means for removing echo components contained in the second input signal $d(n)$ by an output signal of the convolution means.

In another aspect, the present invention provides an adaptive signal processing device for adaptively estimating signal transfer characteristics in a transmission system for processing signals in accordance with the estimation, and outputting the result of processing. The device includes power calculating means for calculating the power of a first input signal entering the device via a transmission system, and filter coefficient updating means for a filter coefficient to be updated based upon the first signal, a signal corresponding to a second input signal to be transmitted via a transmission system less a pseudo-echo component and a signal from the power calculating means. The device also includes convolution means for performing convolution on the first input signal and the filter coefficient from the filter coefficient updating means, and echo removing means for removing the echo component contained in the second input signal with an output signal of the convolution means. The device also has adaptive judgment means for effecting judgment control conforming to the state of filter coefficient convergence based upon the output signal of the echo removing means and the second input signal, and switching means for switching between the output signal of the echo removing means and the second input signal responsive to the result of judgment by the adaptive judgment unit.

In still another aspect, the present invention provides an echo suppressing device for suppressing an echo component contained in an input signal and transmitting the resulting signal. The device includes power calculating means for calculating the power of a first input signal $x(n)$ supplied to a speaker, and filter coefficient updating means for a filter coefficient $h(n+1)(i)$ updated at time $n+1$ based upon the first input signal $x(n)$, a signal $e(n)$ corresponding to a second input signal $d(n)$ entering a microphone less a pseudo-echo component, a signal $2^{Pe}$ output by the power calculating means, a control constant α and a filter coefficient h(n)(i) at time n, in accordance with the equation $$h_{(n+1)}(i)=h_{(n)}(i)+\alpha(e(n)\times(n-1))2^{Pe}$$

The echo suppression device also includes convolution means for performing convolution on the first input signal x(n) and filter coefficients from the filter coefficient updating means, and echo removing means for removing echo components contained in the second input signal d(n) entering the microphone by an output signal of the convolution means.

In yet another aspect, the present invention provides a hand-portable telephone including a microphone, a speaker and power calculating means for calculating the power of a first input signal x(n) supplied to the speaker. The hand-portable telephone also includes filter coefficient updating means for a filter coefficient h(n+1)(i) updated at time n+1 based upon the first input signal x(n), a signal e(n) corresponding to a second input signal d(n) entering the microphone over the transmission system less a pseudo-echo component, a signal $2^{Pe}$ output by the power calculating means, a control constant α and a filter coefficient h(n)(i) at time n, in accordance with the equation $$h_{(n+1)}(i)=h_{(n)}(i)+\alpha(e(n)\times(n-i))2^{Pe}$$

The hand-portable telephone also includes convolution means for performing convolution on the first input signal x(n) supplied to the speaker and filter coefficients from the filter coefficient updating means, and echo removing means for removing echo components contained in the second input signal d(n) entering the microphone by an output signal of the convolution means.

According to the present invention, since the operation of division is omitted from the arithmetic-logical operations in the filter coefficient updating unit for simplifying the operations as compared to those of the learning identification method, there is provided a significant reduction in the arithmetic-logical operations and a saving in power consumption.

According to the present invention, the echo signal produced in the hand-portable telephone that may be canceled by the arithmetic-logical operations is diminished in volume as compared to those required with the conventional device thereby achieving a saving in power consumption.

DESCRIPTION OF THE INVENTION

Figure 1:
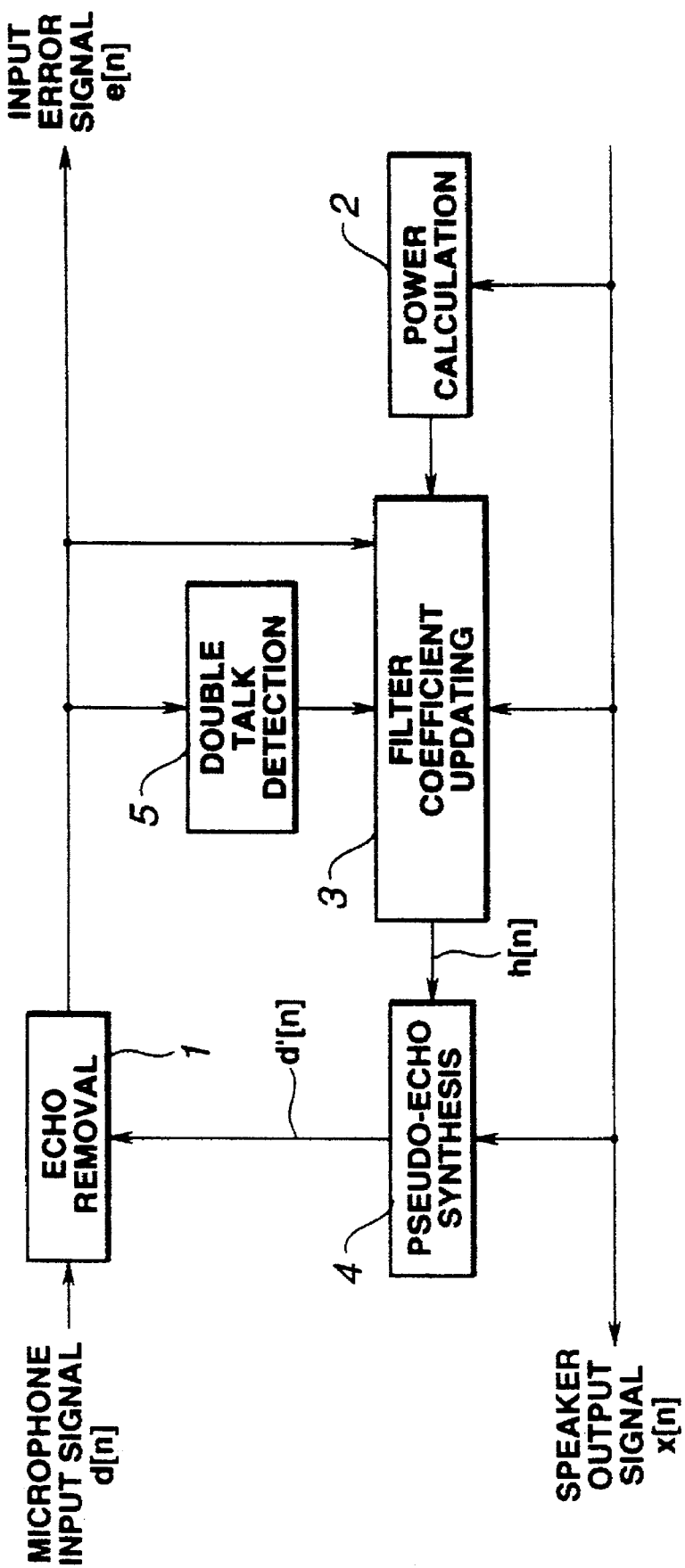
FIG. 1 is a block diagram showing a first embodiment of an adaptive signal processing device according to the present invention.

Referring to the drawings, preferred embodiments of the adaptive signal processing device according to the present invention will be explained in detail. The adaptive signal processing device and the echo suppressing device explained herein are preferably applied to a hand-portable telephone.

With the present hand-portable telephone, the signal transmitted from a called party to a speaker, as a first input signal entering the present hand-portable telephone, is termed a speaker output signal x[n], while a signal of an input supplied to a microphone by the calling party, as a second input signal, is termed a microphone input signal d[n]. The microphone input signal contains echo components due to the fact that an acoustic loop is produced between the speaker and the microphone of the hand-portable telephone so that speech output by the speaker is picked up by the microphone. The variable n specifies a sampling number corresponding to time.

Referring to FIG. 1, the adaptive signal processing device according to the first embodiment of the present invention includes an echo removing unit 1 for removing a pseudo-echo component from the microphone input signal d[n], and a power calculating unit 2 for calculating the power of the speaker output signal x[n] received over a transmission system. The adaptive signal processing device also includes a filter coefficient updating unit 3 for updating the filter coefficients and a pseudo-echo synthesizing unit 4 for generating the pseudo-echo by executing convolution based upon the filter coefficients updated by the filter coefficient updating unit 3, and a double talk detection unit 5 for detecting the quantity of double talk or overlapping speech contained in the signal.

The echo removing unit 1 outputs a difference between the microphone input signal d[n] and a pseudo-echo signal d[n] outputted by the pseudo echo synthesis unit 4 as an input error signal e[n]. This input error signal e[n] is a signal of a residual component corresponding to the microphone input signal d[n] less the echo component. The input error signal e[n] is sent to the called party, while being fed to the filter coefficient updating unit 3.

The pseudo-echo signal d[n] is an output of an estimation system having the speaker output signal x[n], which is an observed signal, as an input, as will be explained subsequently.

The power calculating section 2 calculates the power of the speaker output signal x[n], which is the square sum of the speaker output signal x[n]. The result of the calculations is fed to the filter coefficient updating section 3.

The filter coefficient updating section 3 finds the filter coefficients in accordance with the adaptive algorithm which will be explained subsequently. The filter coefficient updating section 3 sequentially corrects the filter coefficients h(n) and outputs the corrected filter coefficients to the pseudo-echo synthesizing section 4. This filter coefficient h(n) is an estimated impulse response of the actual echo path. As for the filter updating section 3, the adaptive algorithm for calculations will be discussed subsequently.

The pseudo-echo synthesizing section 4 synthesizes the pseudo-echo signal d'[n] by convolution based upon the filter coefficient h(n) from the filter coefficient updating unit 3 and the speaker output signal x[n]. The pseudo-echo synthesizing section 4 transmits the pseudo-echo signal d'[n] to the echo removing unit 1.

The adaptive algorithm executed in the filter coefficient updating unit 3 will be explained.

If the microphone input signal containing echo components, the speaker output signal and the signal of the impulse response in an echo-generating route at time n are d[n], x[n] and w[n], respectively, the microphone input signal d[n] is given by:

$$d[n] = \sum_{i=0}^{N} w[i] \cdot x(n-i) \quad (1)$$

In the pseudo-echo synthesizing unit 4, the pseudo-echo signal d'[n] of the impulse response of the pseudo echo is represented by $$d'[n] = \sum_{i=0}^{N} h[i] \cdot x(n-i) \quad (2)$$

The equation (3) representing a signal e[n] containing residual echo components is obtained by subtracting the equation (2) from the equation (1) and is given as $$e[n] = d[n] - d'[n] = \sum_{i=0}^{N} (w[i] - h[i]) x[n-1] \quad (3)$$

In the equation (3), w[i] and h[i] denote a signal of the first impulse response, referred to herein as impulse response and the i'th filter coefficient, respectively.

With the adaptive signal-processing device of the present invention, it is necessary for the filter coefficient h[i] output by the filter coefficient updating section 3 to approach the impulse response w[I]. Among known practical adaptive processing methods employed for this purpose, there is the learning identification method. If, with the learning identification method, the filter coefficient $h_{(n+1)}[i]$ at time n+1 is found using the above-defined various signals at time n, it is represented by $$h_{(n+1)}[i] = h_{(n)}[i] + \frac{\alpha(e[n]x[n-1])}{\sum_{j}^{N} X[n-j]^2} \quad (4)$$

where α is a control constant.

Meanwhile, the denominator of the equation (4) is the result of calculation of the power of the speaker output signal x[n]. Since the equation (4) by the learning identification method calculates the updated filter coefficient representing division with the results of the calculated power, the equation represents considerable load in sample-based sequential processing such as is performed by the echo canceler. The adaptive algorithm of the learning identification method represents the coefficient correction term of the LMS algorithm with the state vector norm of the filter, that is with the above-mentioned result of power calculation. Although the learning identification method exhibits superior converging characteristics, it is inferior to the LMS algorithm in the amount of arithmetic-logical operations. With the adaptive signal processing device of the present invention, for achieving substantially the same processing capability with the amount of the arithmetic-logical operations, the arithmetic-logical operations of the filter coefficient updating unit 3 represented by the equation (4) is set in a manner which is now to be explained.

For simplifying the explanation of the equation (4), the power of the speaker output signal x[n] is set to P and represented by the equation (5):

$$P = \sum_{j}^{N} x[n-j]^2 \quad (5)$$

On the other hand, the power P of the speaker output signal x[n] may be divided by e.g., a normalization command into an index part $P_e$, with 2 as base, and a mantissa part $P_m$, as shown by the equation (6):

$$P = P_m \times 2^{-P_e} \quad (6)$$

The operation of modifying the equation (5) to the equation (6) may be carried out easily by a normalization command. The mantissa part $P_m$ in the equation (6) is set to a value in a range from $0.5 \pm P_m < 1$. Substituting the equation (6) into the equation (4), the equation (4) becomes equation (7):

$$h_{(n+1)}[i] = h_{(n)}[i] + \alpha(e[n] \times [n-i]) 2^{P_e}/P_m \quad (7)$$

For further simplifying the equation (7), the mantissa part $P_m$ is omitted. By such omission, the equation (7) is represented by equation (8):

$$h_{(n+1)}[i] = h_{(n)}[i] + \alpha(e[n] \times [n-i]) 2^{P_e} \quad (8)$$

If the filter coefficient to be updated is calculated based upon the equation (8), the rate of change of the second term of the right side of the equation (8) is one or two times that in the equation (4), such that the converging characteristics are deteriorated to a more or less extent. It is however felt that, in an actual operating environment, echo route fluctuations are not increased drastically. Thus the converging characteristics during actual application are not drastically deteriorated as compared to those in the case of the conventional learning identification method represented by the equation (4).

Many of recent DSPs support the normalization command such that the modification of the equation (6) can be carried out easily. The operation of multiplying the speaker output signal x[n] by the index part of the power P in the equation (8) may be achieved by simple shift operations.

If, while the filter coefficient updating unit 3 sequentially updates the filter coefficients following judgment of the initial convergence of the filter coefficients, the output signal level of the echo removing unit 1 exceeds a pre-set threshold value, the double talk detection unit 5 commands interruption of the updating of the filter coefficients for prohibiting worsening of convergence characteristics otherwise caused by noise admixture.

Referring to the block diagram of FIG. 2, the second embodiment of the adaptive signal processing device of the present invention will be explained. This second embodiment is also the application of the adaptive signal processing device to a hand-portable telephone.

Figure 2:
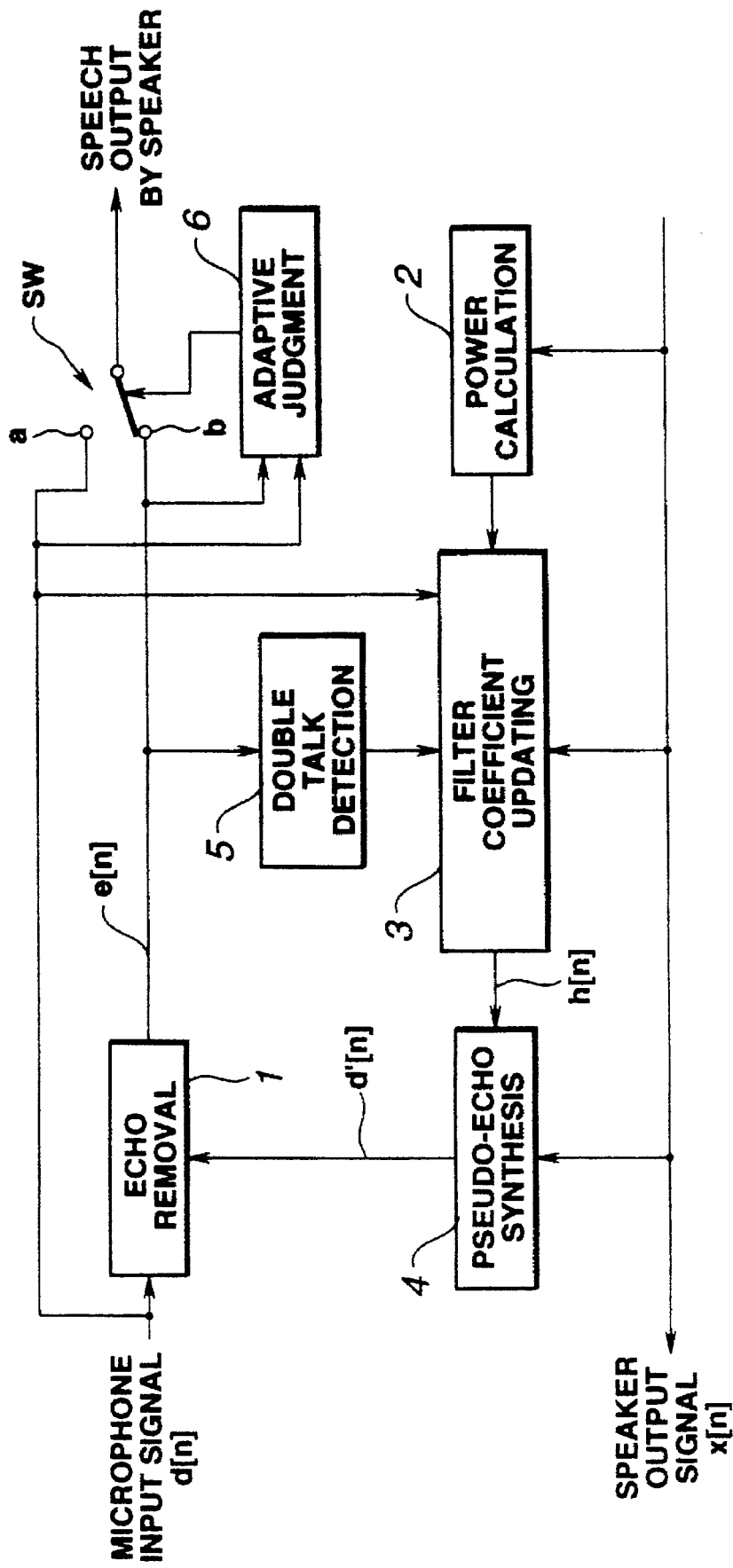
FIG. 2 is a block diagram showing a second embodiment of an adaptive signal processing device according to the present invention.

Referring to FIG. 2, the adaptive signal processing device according to the second embodiment of the present invention includes an echo removing unit 1 for removing a pseudo-echo component from the microphone input signal d[n], and a power calculating unit 2 for calculating the power of the speaker output signal x[n] received over a transmission system. The adaptive signal processing device also includes a filter coefficient updating unit 3 for updating the filter coefficients and a pseudo-echo synthesizing unit 4 for generating the pseudo-echo based upon the filter coefficients updated by the filter coefficient updating unit 3. The adaptive signal processing device also includes a double talk detection unit 5 for detecting the quantity of double talk or overlapping speech contained in the signal and an adaptive judgement unit 8 for judgment control conforming to the converging state of the filter coefficient. The adaptive signal processing device also includes a changeover switch SW for switching its output signal responsive to the results of decision by the adaptive decision unit Since the construction of the echo removing unit 1, power calculating unit 2, pseudo-echo synthesis unit 4 and the double talk detecting unit 5 is the same as that of the above-described first embodiment, the corresponding numerals are used to depict the corresponding parts or components and detailed description is omitted. Although the filter coefficient updating unit 3 may be configured for carrying out the arithmetic-logical operations based upon the equation (8) as in the previous embodiment, the filter coefficient updating unit 3 of the present second embodiment is not limited to this specific filter construction and may be constituted by a filter employed in the conventional learning identification method, that is, may be configured to implement equation (4).

The filter coefficient updating unit 3 capable of handling the learning identification method conventionally employed in the adaptive signal processing device initializes the filter coefficients by one of the following two methods, that is, the method of starting the program by setting the filter coefficient for the initial state $h_{(o)}$ to zero and the method of starting the program based upon a filter coefficient $h_{(o)}$ pre-set to a certain initial value.

The hand-portable telephone, to which is applied the present adaptive signal processing device, has many possible uses. In consideration of fluctuations between terminals, it is advisable to start the zero initial-state filter coefficient $h_{(o)}$.

However, with the portable telephone, the variable surrounding noise or the speech of the calling party affect convergence performance in canceling the echo components contained in the transmitted signals. In particular with the hand-portable telephone, if the speech of the calling party enters the microphone in the course of converging the echo, the input speech of the calling party tends to be distorted.

For overcoming such problem, the present adaptive signal processing device has an adaptive judgment unit 8 and a changeover switch SW for suppressing the outputting of the input error signal e[n] and for prohibiting the distortion in the speech of the speaking party until the echo suppressing quantity indicating the result of echo convergence reaches a pre-set level.

The adaptive judgment unit 8 judges the state as to whether the amount of echo suppression reaches a pre-set level and outputs a control signal responsive to the result of judgment.

The changeover switch SW is provided for switching between the microphone input signal d[n] and the input error signal e[n] outputted from the echo removing unit 4 responsive to a changeover control signal from the adaptive judgment unit 6.

By modifying the equation (3) employed in the adaptive signal processing device, equation (9)

$$d[n] = \sum_{i}^{N} h[i]x[n-i] + e[n] \quad (9)$$

is obtained. Using the equation (9), an amount of echo suppression ERLE as an index representing the degree of convergence of echo cancellation in the output signal to the transmission system is provided. The amount of echo suppression ERLE is defined by the equation (10):

$$ERLE = inputechopower/residualechopower \quad (10)$$

The input echo power is a square sum of the microphone input signal d[n], while the residual echo power is the square sum of the input error signals e[n].

Using the equation (10), the adaptive judgment unit 6 compares the amount of echo suppression ERLE to a pre-set threshold value. When judging that the amount of echo suppression ERLE exceeds the pre-set threshold, the adaptive decision unit 6 outputs a changeover control signal for setting the movable contact of the changeover switch SW to a fixed terminal b. Until this state is reached, the adaptive decision unit 6 causes a signal to be outputted from the terminal a of the changeover switch SW.

Figure 3:
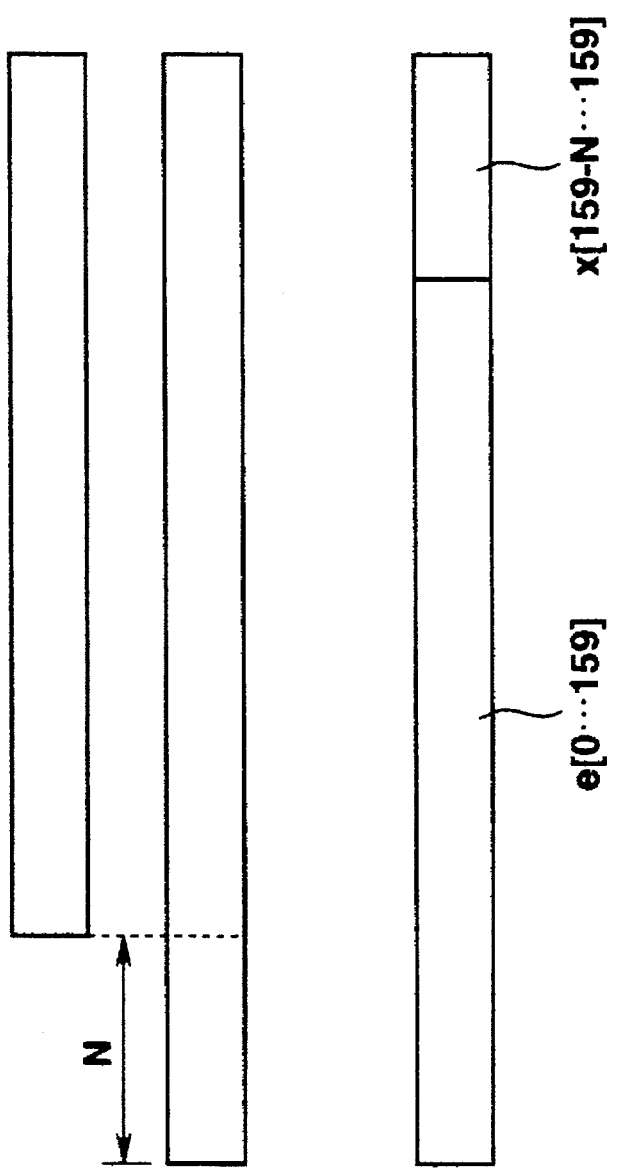
FIGS. 3a to 3c are diagrammatic views showing the method for memory saving in calculating the quantity of echo suppression ERLE in an adaptive discriminating portion of the adaptive signal processing device shown in FIG. 2.

Referring to FIGS. 3(a) to 3(c), the method of more practical memory saving in calculating the amount of echo suppression ERLE by the adaptive decision unit 6 is explained.

The processing by a speech codec of the hand-portable telephone is based upon e.g., 160 samples as a unit. For the microphone input signal d[n] and the speaker output signal x[n], the memory is set as shown in FIGS. 3(a) and 3(b).

In FIGS. 3(a) and 3(b), N denotes the number of taps of an adaptive filter.

The memory for the microphone input signal d[n] represents the microphone input signal as d[0, . . . 159], based upon n=0 to 159. The memory for the speaker output signal x[n] has the capacity inclusive of the number of taps of the adaptive filter. If the number of the taps N in the memory of the speaker output signals x[n] is represented by negative integers, the memory capacity is represented as -N,, . . . , 0, . . . , 159, or as x[-N . . . , 159].

Referring to equation (9), the memory employs x[n] to x[n–N] at time n, as will be seen from x[n–i] of the first term. However, at time (n+1), the memory uses only up to x[n+1–N], so that the memory area x[n–N] becomes unnecessary. If the input error signal e[n] is written in the area which has thus become unnecessary, the memory storage capacity may be exploited effectively. Based upon this technique, the input error signals e[0 . . . 159] and x[159-N . . . 159] are separately written in the memory after processing 160 samples, as shown in FIG. 3(c).

Thus the adaptive judgment unit 6 calculates the power from data of the microphone input signal d[0 . . . 159] and the input error signals e[0 . . . 159]. The adaptive judgment unit 6 substitutes the power thus found in the equation (10) in order to find a ratio which is the amount of echo suppression ERLE. The adaptive judgment unit 6 judges whether or not the amount of echo suppression ERLE reaches a value exceeding a ratio showing the state of convergence in the initial state. The adaptive judgment unit 6 is responsive to the result of judgment to transmit the changeover control signal to the changeover switch SW.

By the above operation, it is possible with the hand-portable telephone to prohibit distortion in the speech of the speaking party in order to carry out communication over the transmission system satisfactorily.

The signal x[159-N . . . 159] is preserved for the next frame.

Figure 4:
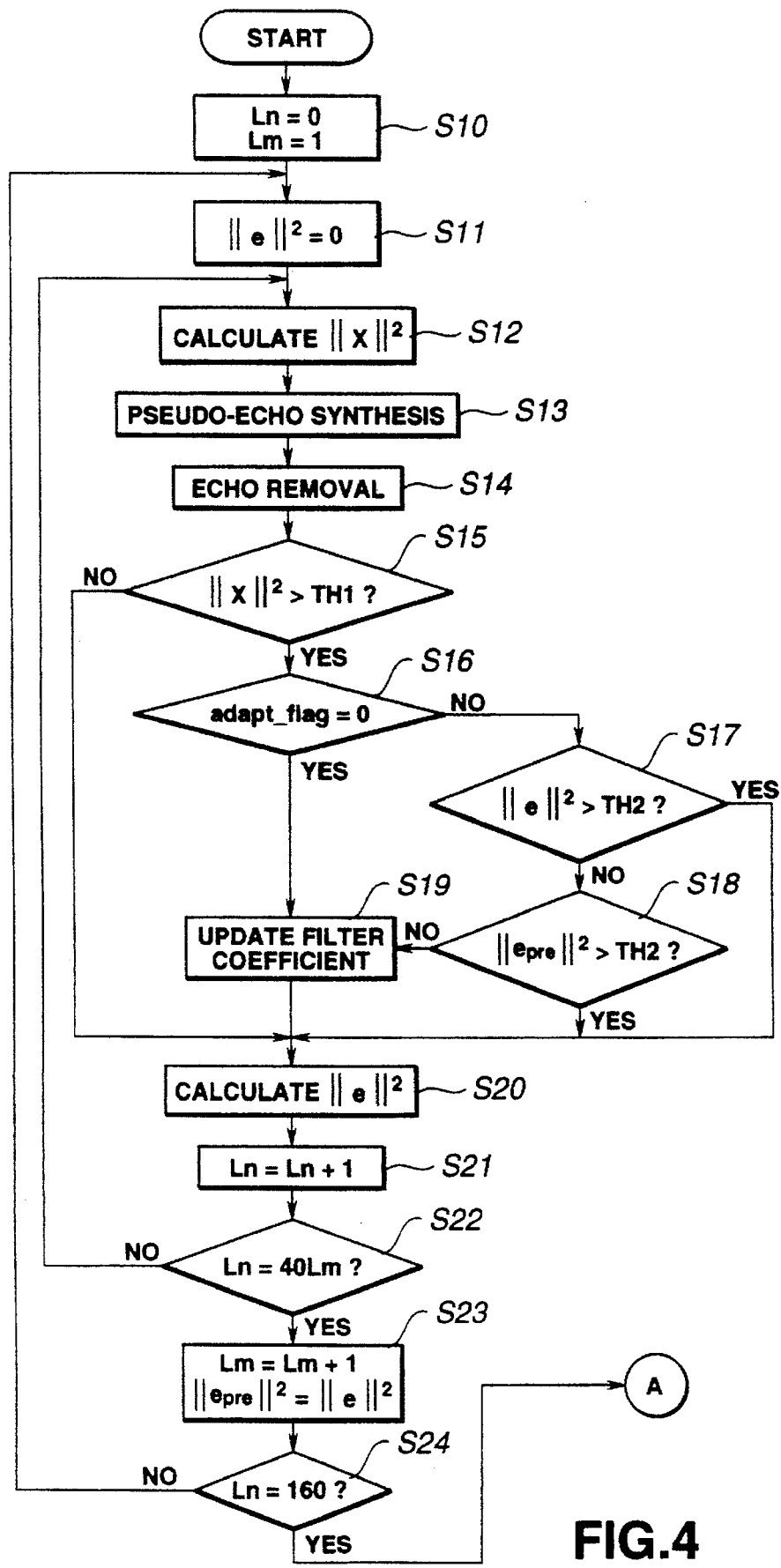
FIG. 4 is a flow chart for illustrating the operation in an adaptive signal processing device according to the second embodiment.
Figure 5:
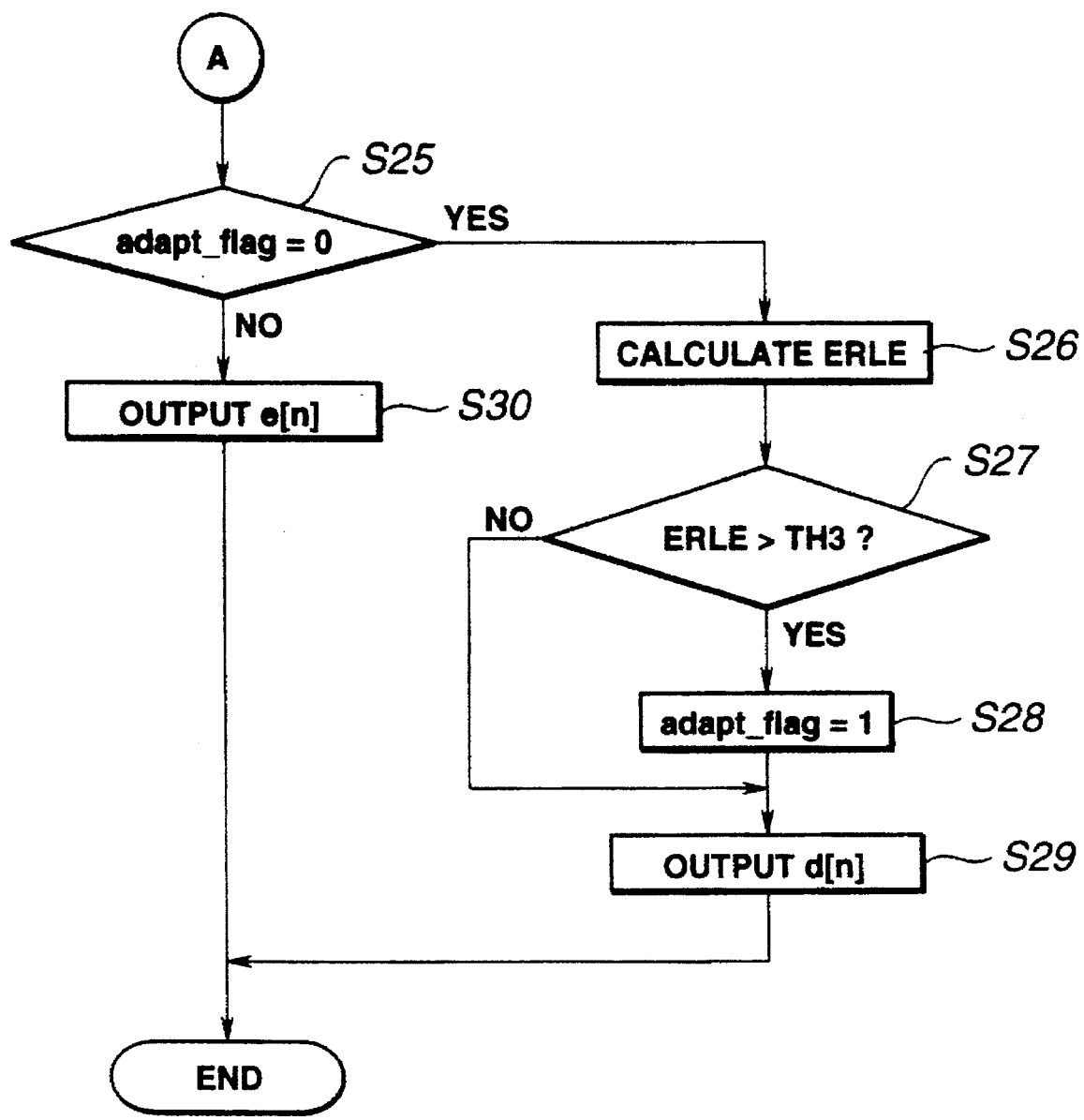
FIG. 5 is a flow chart for illustrating the operation in an adaptive signal processing device according to a third embodiment of the present invention.

Referring to the block diagram of FIG. 2 and the flow charts of FIGS. 4 and 5, the adaptive signal processing device of the above-described second embodiment is explained.

The second embodiment of the adaptive signal processing device employs a flag adapt_flag indicating that the adaptive processing for echo canceling has been set. If an echo canceling routine is called, the second embodiment of the adaptive signal processing device starts the echo canceling routine, and the flag adapt_flag is set to its initial value 0.

At step S10, loop counters Ln, Lm are set to 0 and 1, respectively, before the program transfers to step S11.

At step S11, the power $|e|^2$ for the input error signal e[n] is set to 0.

At step S12, the power of the speaker output signal x[n] at time n is calculated at the power calculating unit 2. The power is denoted as $|x|_2$. The power calculating unit 2 outputs the index part of the results of calculation $|x|^2$ to the filter coefficient updating unit 3, in which the filter coefficient is set to an initial state of zero.

At step S13, the pseudo echo signal d'[n] is synthesized at the pseudo-echo synthesizing unit 4 based upon the equation (2). As will be apparent from the equation (2), the pseudo-echo signal d'[n] is calculated by convolution based upon the speaker output signal x[n] and the filter coefficient h[n].

At step S14, the operation of subtracting the pseudo-echo signal d'[n] calculated at step S12 from the microphone input signal d[n], which is the speech of the speaking party entering the hand-portable telephone, is carried out in the echo removing unit 1. Thus the microphone input signal d[n] is freed of the echo components. After this processing, the program transfers to step S15.

At step S15, it is judged whether or not the magnitude of the power $|x|^2$ of the speaker output signal x[n] as found at step S12 is larger than a pre-set signal power value TH1. If the result of judgment is YES, that is if the power $|x|^2$ is larger than the pre-set signal power value TH1, the speaker output signal x[n] is judged to have an output signal level necessary for updating the filter coefficients. Thus the program transfers to step S18. If the result of judgment is NO, that is if the power $|x|^2$ is not larger than the pre-set signal power value TH1, the speaker output signal x[n] is judged not to have an output signal level necessary for updating the filter coefficients. Thus the program skips the step concerning the filter coefficient updating and transfers to step S20.

At step S16, it is judged whether or not the flag adapt_flag is zero. If the flag adapt_flag is zero (YES), the program transfers to step S19. If the flag adapt_flag is not zero (NO), it specifies that the adaptive processing for the echo is initially converged, so the program transfers to step S17. At step S17, it is judged whether or not the power $|e|^2$ calculated at a later step based upon the input error signal e[n] is larger than a pre-set threshold TH2. If the power $|e|^2$ is larger than the threshold TH2 (YES), the program skips up to step S20 without updating the filter coefficients. If the power $|e|^2$ is not more than the threshold value TH2 (NO), the program transfers to step S18.

At step S18, it is judged whether or not the power $|e_{pre}|^2$ of an input error signal $e_{pre}$ of a directly previous sub-frame in the speech codec is larger than the pre-set threshold TH2. If the power $|e_{pre}|^2$ is larger than the pre-set threshold TH2 (YES), the program skips to step S20 without updating the filter coefficient. If the power $|e_{pre}|^2$ is not larger than the pre-set threshold TH2 (NO), the program transfers to step S19.

The sub-frame means a sub-group of 40 samples among 160 samples making up each frame. Thus, at the step S18, the power in a sub-frame is compared to the pre-set threshold value TH2.

The processing at the steps S17 and S18 is performed at the double talk detecting unit 5 shown in FIG. 2. The double talk means a phenomenon in which the speech of the calling party and that of the called party are superimposed during the call. In such state, the filter coefficient convergence is worsened. If such double talk is found at the steps S17 and S18 to have occurred, the filter coefficient updating is halted to prevent distortion from being incurred in the speech of the users.

At step S19, the filter coefficient is updated. For updating the filter coefficient, the filter coefficient updating unit 3 shown in FIG. 2 normalizes the power by the equation (6). The result produced is substituted into the equation (8) in order to calculate the filter coefficient at time n+1 from the filter coefficient at time n.

The pseudo-echo synthesizing unit 4 of FIG. 2 performs convolution on the updated filter coefficient and the input speaker output signal x[n], in a manner not shown explicitly, for supplying the pseudo-echo signal d'[n], estimated for the echo route, to the echo removing unit 1. The echo removing unit 1 subtracts the pseudo-echo signal d'[n] from the microphone input signal d[n] by the user to find the input error signal e[n]. This input error signal e[n] is supplied both to the fixed terminal b of the changeover switch SW and to the adaptive judgment unit 6.

At step S20, the adaptive judgment unit 6 finds the power $|e|^2$ of the input error signal e[n]. This power $|e|^2$ is calculated so as to be updated at an interval of 40 samples, that is at a sub-frame interval.

At step S21, the value of the loop counter Ln specifying the number of samples is incremented by one so that the program transfers to step S22.

At step SEE, it is judged whether or not the result of multiplication of the number of counts of the sub-frames as counted by the loop counter Lm by 40, which is the number of samples of the sub-frames, coincides with the number of counts by the loop counter Ln. If the result indicates non-coincidence (NO), the program reverts to step S12 in order to repeat the above-described processing operations. If the result of judgment indicates coincidence (YES), the program transfers to step S23 in order to execute the arithmetic-logical operation on the sub-frame basis.

At step S23, the value of the loop counter Lm is incremented by one and the power $|e|^2$ as found at step S20 is substituted as the power $|e_{pre}|^2$ of the directly previous frame to update the value of the power, $|e_{pre}|^2$. After the updating operation, the program transfers to step S24.

At step S24, it is judged at the loop counter Ln whether or not the number of samples reaches 160. If the count value by the loop counter Ln, that is the number of samples, does not yet reach 160 (NO), the program reverts to step S11 in order to repeat the above-described operations. If the count value of the loop counter Ln, that is the number of samples, reaches 160 (YES), the one-frame operation is judged to have come to a close and the program transfers via a connector A and a connector of FIG. 5 to step S25.

At step S25, it is judged at the adaptive judgment unit 6 whether or not the flag adapt_flag is zero. If the flag adapt flag is 0 (YES)., the program transfers to step S26.

At step S26, the amount of echo suppression EELE is calculated.

At the next step S27, it is checked whether or not the echo suppression quantity as found at the adaptive judgment unit 6 is larger than a pre-set threshold TH3. If the amount of echo suppression ERLE is larger than the threshold value TH3 (YES), the program transfers to step S28. If the amount of echo suppression ERLE is not larger than the threshold value TH3 (NO), the program transfers to step S29.

At step S28, the value of the flag adapt_flag is set to 1, responsive to the result of step S27. The program then transfers to step S29.

At step S29, the adaptive judgment unit 6 judges the convergence to be insufficient and outputs a changeover control signal to the changeover switch SW so as to issue the microphone input signal d[n]. The changeover switch SW is responsive to the changeover control signal to set its movable contact to the fixed terminal a fed with the microphone input signal d[n] in order to output the microphone input signal d[n]. The outputting of the microphone input signal d[n] terminates the echo canceler routine.

If the value of the flag adapt_flag at step S25 is not zero (NO), it is judged that the input error signal e[n] has converged as a result of the adaptive processing. The program then transfers to step S30.

At step S30, a changeover control signal is outputted to the changeover switch SW in order for the input error signal e[n] to be issued from the adaptive judgment unit 6. The changeover switch SW is responsive to the changeover control signal to set its movable contact to the fixed terminal h in order to output the input error signal d[n]. The outputting of the input error signal e[n] terminates the echo canceler routine.

The processing operation for suppressing the echo contained in the input signal from the user in the above-described sequence diminishes the amount of arithmetic-logical operations as compared to the conventional processing. This allows the operation by the DSP to be diminished and to suppress the power consumption.

The speech by the user may be prohibited from being distorted by inhibiting the operation of the echo canceler until initial convergence is achieved based upon the results of the adaptive judgment unit 8.

The speech by the user may similarly be prohibited from being distorted by terminating the updating of the filter coefficient responsive to judgment with respect to the pre-set threshold.

With the above-described embodiment, the amount of the arithmetic-logical operations may be significantly diminished for relieving the load of the DSP, thus allowing to suppress power consumption of the adaptive signal processing device, despite the fact that the operation of division contained in the conventional learning identification method is omitted for simplifying the arithmetic-logical operations performed by the filter coefficient updating unit 3 and the satisfactory convergence inherent to the conventional learning identification method is maintained. The result is that a high-speed adaptive processing may be achieved as compared with the conventional adaptive signal processing device.

Since the received signal supplied as the first input signal x[n] is outputted to a speaker, and the signal supplied from the speaking party over the microphone is processed with an echo suppressing operation, the echo signal, which is among the inconveniences caused in communication equipment, such as hand-portable telephone, can be canceled.

The filter coefficient updating unit 3 checks the state of filter coefficient convergence and, if it finds that the filter coefficients are converging, it discontinues updating the filter coefficient when the signal level of the echo removing unit 1 exceeds a pre-set threshold in order to prevent distortion in the speech of the speaking party by the echo canceling employing inadequate filter coefficients.

On the other hand, the adaptive signal processing device adaptively checks the state of filter coefficient convergence in the adaptive judgment unit 6 for effecting switching between the output signal e[n] from the echo removing unit 1 and the second input signal d[n] for prohibiting distortion in the speech produced by the converging adaptive filter coefficients on the basis of the admixture of the speech of the speaking party.

In addition, the adaptive signal processing device outputs the first input signal x[n], as the supplied reception signal, at a speaker, and processes the signal supplied by the speaking party over the microphone as the second input signal d[n], for diminishing the amount of the arithmetic-logical operations in canceling the echo signal, which is among the inconveniences incurred in the communication equipment, such as hand-portable telephone, for lowering power consumption.

Furthermore, the echo canceler is controlled so as not to be actuated until initial convergence, based upon the results of judgment by the adaptive judgment unit 8, so that distortion may be prohibited from being produced in the transmitted speech of the speaking party.

What is claimed is:

1. An adaptive signal processing device for adaptively estimating signal transfer characteristics in a transmission system for processing signals in accordance with said estimation, said device comprising:

power calculating means for calculating a power of a first input signal x(n) entering said device via a transmission system;

filter coefficient updating means for calculating a filter coefficient $h_{(n+1)}(i)$ updated at time n+1 based upon said first input signal x(n), a signal e(n) corresponding to a second input signal d(n) transmitted over said transmission system less a pseudo-echo component, a signal $2^{Pe}$ output by said power calculating means, a control constant $\alpha$, and a filter coefficient $h_{(n)}(i)$ for time n, in accordance with an equation $$h_{(n+1)}(i)=h_{(n)}(i)+\alpha(e(n)\times(n-1))2^{Pe};$$

convolution means for performing convolution on said first input signal x(n) and filter coefficients from said filter coefficient updating means; and echo removing means for removing echo components contained in said second input signal d(n) by an output signal of said convolution means.

2. The adaptive signal processing device as claimed in claim 1, wherein said filter coefficient updating means discontinues updating of said filter coefficient when an amount of echo suppression of said echo removing means exceeds a pre-set threshold value.

3. The adaptive signal processing device as claimed in claim 1, further comprising:

control means for interrupting updating of said filter coefficient by said filter coefficient updating means upon detecting an occurrence of overlapping speech signals.

4. The adaptive signal processing device as claimed in claim 1, further comprising:

adaptive judgment means for effecting judgment control conforming to a state of filter coefficient convergence based upon an output signal of said echo removing means and said second input signal d(n); and switching means responsive to said adaptive judgement means for switching between said output signal of said echo removing means and said second input signal d(n).

5. The adaptive signal processing device as claimed in claim 2, further comprising:

control means for interrupting said updating of said filter coefficient by said filter coefficient updating means when said amount of echo suppression of said echo removing means exceeds said preset threshold value.

6. An adaptive signal processing device for adaptively estimating signal transfer characteristics in a transmission system, processing signals in accordance with said estimation, and outputting a result of said processing, said device comprising:

power calculating means for calculating a power of a first input signal entering said device via a transmission system;

filter coefficient updating means for calculating a filter coefficient updated based upon said first input signal, a signal corresponding to a second input signal transmitted via said transmission system less a pseudo-echo component, and a signal from said power calculating means;

convolution means for performing convolution on said first input signal and said filter coefficient from said filter coefficient updating means;

echo removing means for removing an echo component contained in said second input signal with an output signal of said convolution means;

adaptive judgment means for effecting judgment control conforming to a state of filter coefficient convergence based upon an output signal of said echo removing means and said second input signal; and switching means for switching between said output signal of said echo removing means and said second input signal responsive to a judgment result from said adaptive judgment means.

7. The adaptive signal processing device as claimed in claim 6, wherein said filter coefficient updating means calculates a filter coefficient updated at time n+1 based upon said first input signal x(n), a signal e(n) corresponding to a second input signal d(n) transmitted over said transmission system less a pseudo-echo component, a signal $2^{Pe}$ output by said power calculating means, a control constant α, and a filter coefficient $h_{(n)}(i)$ for time n, in accordance with an equation $$h_{(n+1)}(i)=h_{(n)}(i)+\alpha(e(n)\times(n-1))2^{Pe}.$$

8. The adaptive signal processing device as claimed in claim 6, further comprising control means for interrupting updating of said filter coefficient by said filter coefficient updating means when a signal level of said output signal of said echo removing means exceeds a pre-set threshold value.

9. The adaptive signal processing device as claimed in claim 6, further comprising control means for interrupting updating of said filter coefficient by said filter coefficient updating means upon detecting an occurrence of overlapping speech signals.

10. An echo suppressing device for suppressing an echo component contained in an input signal and transmitting a resulting signal, said device comprising:

power calculating means for calculating a power of a first input signal x(n) supplied to a speaker;

filter coefficient updating means for calculating a filter coefficient $h_{(n+1)}(i)$. updated at time n+1 based upon said first input signal x(n), a signal e(n) corresponding to a second input signal d(n) entering a microphone less a pseudo-echo component, a signal $2^{Pe}$ output by said power calculating means, a control constant α, and a filter coefficient $h_{(n+1)}(i)$ for time n, in accordance with an equation $$h_{(n+1)}(i)=h_{(n)}(i)+\alpha(e(n)\times(n-1))2^{Pe};$$

convolution means for performing convolution on said first input signal x(n) and filter coefficients from said filter coefficient updating means; and echo removing means for removing echo components contained in said second input signal d(n) entering microphone by an output signal of said convolution means.

11. The echo suppressing device as claimed in claim 10, further comprising:

adaptive judgment means for effecting judgment control conforming to a state of filter coefficient convergence based upon said output signal of said echo removing means and said second input signal d(n); and switching means for switching between said output signal of said echo removing means and said second input signal d(n) responsive to a judgment result from said adaptive judgment means.

12. A hand-portable telephone, comprising:

a microphone;

a speaker;

power calculating means for calculating a power of a first input signal x(n) supplied to said speaker;

filter coefficient updating means for calculating a filter coefficient $h_{(n+1)}(i)$ updated at time n+1 based upon said first input signal x(n), a signal e (n) corresponding to a second input signal d(n) entering said microphone over a transmission system less a pseudo-echo component, a signal $2^{Pe}$ output by said power calculating means, a control constant α, and a filter coefficient $h_{(n)}(i)$ for time n, in accordance with an equation $$h_{(n+1)}(i)=h_{(n)}(i)+\alpha(e(n)\times(n-1))2^{Pe};$$

convolution means for performing convolution on said first input signal x(n) supplied to said speaker and filter coefficients from said filter coefficient updating means; and echo removing means for removing echo components contained in said second input signal d(n) entering said microphone by an output signal of said convolution means.

13. The hand-portable telephone as claimed in claim 12, wherein said filter coefficient updating means discontinues updating of said filter coefficient when an amount of echo suppression of said echo removing means exceeds a pre-set threshold value.

14. The hand-portable telephone as claimed in claim 12, further comprising:

control means for interrupting updating of said filter coefficient by said filter coefficient updating means upon detecting an occurrence of overlapping speech signals.

15. The hand-portable telephone as claimed in claim 12, further comprising:

adaptive judgment means for effecting judgment control conforming to a state of filter coefficient convergence based upon a compression of an output signal of said echo removing means and said second input signal d(n); and switching means for switching between said output signal of said echo removing means and said second input signal d(n) entering said microphone.

16. The hand-portable telephone as claimed in claim 13, further comprising:

control means for interrupting updating of said filter coefficient by said filter coefficient updating means when said amount of echo suppression of said echo removing means exceeds said pre-set threshold value.

\* \* \* \* \*

UNITED STATES PATENT AND TRADEMARK OFFICE
CERTIFICATE OF CORRECTION

PATENT NO. : 5,661,795  Page 1 of 2
DATED     : Aug. 26, 1997
INVENTOR(S) : Yuji Maeda It is certified that error appears in the above-identified patent and that said Letters Patent is hereby corrected as shown below:

On title Page, under "U.S. Patent Documents," insert --5,381,475 1/95 Cavallo 379/410--
In the Abstract, lines 9&10, change "h(n+1)" to --$h_{(n+1)}$--
               line 15, change "h(n)(i)" to --$h_{(n)}$ (i)--
Col.2, line 19, change "h(n+1)" to --$h_{(n+1)}$--
      line 24, change "h(n)" to --$h_{(n)}$--
      line 64, change "h(n+1)" to --$h_{(n+1)}$--
Col.3, line 1, change "h(n)" to --$h_{(n)}$--
      line 16, change "h(n+1)" to --$h_{(n+1)}$--
      line 21, change "h(n)" to --$h_{(n)}$--
Col.4, line 33, change "d[n]" to --d'[n]--
      line 39, change "d[n]" to --d'[n]--
      line 50, change "h(n)" to --$h_{(n)}$--
      line 52, change "h(n)" to --$h_{(n)}$--
      line 58, change "h(n)" to --$h_{(n)}$--
Col.6, line 60, change "8" to --6--
      line 64, after "unit" insert --6.--
Col.7, line 33, change "8" to --6--
      line 39, change "8" to --6--
Col.8, line 66, change "/$x/_2$" to --/$x/^2$--
Col.9, line 22, change "S18" to --S16--
Col.10, line 16, change "SEE" to --S22--
       line 28, change "/$e_{pre}2$" to --/$e_{pre}/^2$--
       line 29, after "/$e_{pre}/^2$" insert --.--
       line 43, change "EELE" to --ERLE--
Col.11, line 6, change "h" to --b--
       line 18, change "8" to --6--
Col.12, line 1, change "8" to --6--

UNITED STATES PATENT AND TRADEMARK OFFICE
CERTIFICATE OF CORRECTION

PATENT NO. : 5,661,795
DATED : Aug. 26, 1997
INVENTOR(S) : Yuji Maeda

It is certified that error appears in the above-identified patent and that said Letters Patent is hereby corrected as shown below:

<u>In the claims:</u>
Col.13, line 48, after "(i)" delete "."
Col.14, line 17, change "$h_{(n+1)}$," to --$h_{(n+1)}$--

Signed and Sealed this

Sixth Day of October, 1998

Attest:

BRUCE LEHMAN

Attesting Officer

Commissioner of Patents and Trademarks